US010016910B2

(12) United States Patent
Pirri et al.

(10) Patent No.: US 10,016,910 B2
(45) Date of Patent: Jul. 10, 2018

(54) TRUCK MIXER WITH DEVICE TO MAKE THE DRUM OF THE MIXER ROTATE

(71) Applicant: CIFA SPA, Senago (IT)

(72) Inventors: Nicola Pirri, Milan (IT); Emanuele Zorzi, Cesano Maderno (IT); Federico Cheli, Milan (IT); Ferdinando Mapelli, Olginate (IT); Davide Tarsitano, Caronno Pertusella (IT)

(73) Assignee: CIFA SPA, Senago (IT)

( * ) Notice: Subject to any disclaimer, the term of this patent is extended or adjusted under 35 U.S.C. 154(b) by 0 days.

(21) Appl. No.: 15/868,402

(22) Filed: Jan. 11, 2018

(65) Prior Publication Data
US 2018/0154550 A1 Jun. 7, 2018

Related U.S. Application Data

(62) Division of application No. 14/374,327, filed as application No. PCT/IB2013/000091 on Jan. 25, 2013, now Pat. No. 9,884,431.

(30) Foreign Application Priority Data

Jan. 26, 2012 (IT) .............................. MI2012A0093

(51) Int. Cl.
*B28C 5/42* (2006.01)
*B60W 10/26* (2006.01)
*B60W 10/30* (2006.01)
*B60W 10/08* (2006.01)

(52) U.S. Cl.
CPC .............. *B28C 5/421* (2013.01); *B60W 10/08* (2013.01); *B60W 10/26* (2013.01); *B60W 10/30* (2013.01)

(58) Field of Classification Search
CPC ........ B28C 5/421; B60W 20/10; B60W 10/08
See application file for complete search history.

(56) References Cited

U.S. PATENT DOCUMENTS

2009/0095549 A1 4/2009 Dalum et al.
2011/0241420 A1 10/2011 Hering et al.

FOREIGN PATENT DOCUMENTS

JP 2003226192 8/2003
JP 2011151965 8/2011

OTHER PUBLICATIONS

Written Opinion and International Search Report for PCT/IB2013/000091, dated Oct. 5, 2013; 9 pages.

*Primary Examiner* — Tony G Soohoo
*Assistant Examiner* — Elizabeth Insler
(74) *Attorney, Agent, or Firm* — Rankin, Hill & Clark LLP

(57) ABSTRACT

Method to make to rotate a drum of a concrete mixer comprising a vehicle provided with a movement unit having wheels, to effect the movement of the vehicle, a concrete mixer mounted on the vehicle and comprising a drum, and a device to selectively make the drum rotate. The method provides to feed an electric motor connected to the drum by means of an electric energy generator unit suitable to selectively feed the electric motor.

4 Claims, 2 Drawing Sheets

TRUCK MIXER WITH DEVICE TO MAKE THE DRUM OF THE MIXER ROTATE

This application is a divisional of U.S. application Ser. No. 14/374,327 filed on Jul. 24, 2014 which claims priority to PCT/IB2013/000091 filed Jul. 25, 2013, which is expressly incorporated herein by reference.

FIELD OF THE INVENTION

The present invention concerns a truck mixer provided with a device to make the concrete-mixing drum rotate.

In particular, the device at least partly uses the mechanical energy of the heat engine, provided to move the vehicle, in order to feed a second motor associated with the rotating drum.

BACKGROUND OF THE INVENTION

It is known to use truck mixers to transport concrete from a production plant to the building site where the concrete is used.

Both during the loading step in the production plant and during the transport step toward the site, the concrete must be kept malleable, and therefore the rotating drum, which contains the concrete, must be kept in constant rotation to prevent the concrete from drying or hardening.

Moreover, upon arrival at the site, the truck mixer sometimes has to wait its turn to unload. During this step too, the rotating drum must be kept in constant rotation.

Before the unloading step, the concrete undergoes a homogenization step in which the drum of the truck mixer is made to rotate at its maximum rotation speed.

During the unloading step of the concrete the drum is made to rotate in a direction opposite the mixing direction.

In known truck mixers, the rotation of the rotating drum occurs normally using a hydraulic motor, which is moved by a group of pumps commanded by a heat engine which is usually a diesel engine. The heat engine can be the one that moves the vehicle or an auxiliary engine independent from that of the vehicle which is mounted on it.

One disadvantage of known truck mixers is that, in order to command the hydraulic motor associated with the rotating drum, the heat engine must be kept always in motion, during both the loading step and the unloading step of the concrete, at least until the unloading step is finished, with consequent emissions of exhaust gases which are harmful both for the health and the environment.

From documents JP-A-2003/226192, JP-A-2003/301802, and from document DE-U-20 2009 001416 a solution is known in which the rotating drum of the truck mixer is driven by means of an electric motor.

In particular, document JP-A-2003/226192 describes a truck mixer provided with a rotating drum connected directly, by means of reduction members, to the electric motor. The electric motor is fed, depending on the functioning conditions, either by an electric energy generator driven directly by the heat engine of the truck mixer, or by electric energy accumulation batteries. The selection of the electric feed to the electric motor by the generator or the batteries is done by a switch. Stabilization devices are also provided, to stabilize the electric energy supplied by the electric generator and speed adjustment devices.

This solution is not very efficient, it has a reduced operating flexibility and low electric yield, with a consequent reduction in functioning autonomy.

One purpose of the present invention is to obtain a truck mixer whose drum is made to rotate exclusively by means of electric means without requiring a hydraulic type application as provided in document JP-A-2003/301802 for example.

Another purpose of the present invention is to obtain a truck mixer provided with electric means to actuate the drum which are efficient, flexible and which allow to obtain a higher functioning autonomy.

Another purpose of the present invention is to obtain a truck mixer provided with a device able to make the rotating drum of the cement mixer rotate without needing to keep the heat engine functioning when the vehicle is stopped.

Another purpose of the present invention is to achieve a reduction in fuel consumption, for example diesel oil, and a reduction of the corresponding emissions, for example carbon dioxide and particulate, thus avoiding problems of cost and environmental pollution.

Another purpose is to achieve a reduction in noise and to safeguard the health of the people who are in the vicinity of the truck mixer, including the operators at the building site where the truck mixer is.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, a truck mixer according to the present invention comprises a vehicle provided with first motor means, which cooperate with a movement unit having wheels to move the vehicle, a concrete mixer mounted on the vehicle and having a rotating drum, and a device to make the drum selectively rotate by means of second motor means.

In accordance with one feature of the present invention, the second motor means comprise an electric motor connected directly, that is, by possible mechanical means, to the drum of the concrete mixer, and an electric energy generator unit suitable to selectively feed the electric motor.

According to another feature, the electric energy generator unit is suitable to be associated to the first motor means, to transform at least part of the mechanical energy produced by the first motor means into electric energy.

In this way it is possible to exploit and use at least a part of the energy produced by the first motor means, provided mainly to move the vehicle, in order to command the electric motor connected to the rotating drum.

Moreover, with the present invention, the drum is made to rotate exclusively by means of electric means, avoiding the use of hydraulic components. This therefore avoids the use of oil, with consequent reduction of environmental impact, of the cost of disposing of the oil, and reduction in maintenance interventions.

In accordance with another feature of the invention, the electric energy generator unit comprises:
  an alternator which can be connected to the first motor means in order to convert the mechanical energy supplied by the first motor means into electric energy;
  first tension conversion means from alternate to continuous, connected to the alternator in order to convert the electric energy produced by the alternator;

at least an accumulator of continuous electric energy connected to the first conversion means in order to accumulate at least the electric energy produced by the first conversion means;

second tension conversion means from continuous to alternate, connected to the accumulator in order to supply alternate electric energy to the electric motor.

In accordance with a secondary characteristic of the present invention, the aforesaid first motor means comprise a heat engine, provided with a drive shaft, and the electric energy generator unit comprises an alternator, connected to the drive shaft of the heat engine to absorb mechanical energy from the drive shaft to be converted into electric energy.

The at least one accumulator, associable both with the alternator and with a possible external source of electric energy, allows to accumulate electric energy produced by the alternator at least when the first motor means are activated. The electric motor can therefore take electric energy both directly from the alternator and from the accumulator.

According to a variant, the accumulator can be connected to an external source of energy such as an external electric network. To this purpose, another tension conversion mean from alternate to continuous is connected to the accumulator in order to convert the electric energy supplied by the external source of electric energy.

With the truck mixer according to the present invention, we obtain the advantage of reducing the fuel and the corresponding gaseous emissions, which are harmful for health and the environment.

Moreover, the overall noise generated during the operations of unloading the concrete is also reduced to a minimum, because those operations can be carried out with the heat engine switched off, feeding the electric motor coupled to the drum of the concrete mixer with the energy accumulated in the accumulators.

Moreover, with the use of the electric motor and the associated electric energy generator unit, a greater efficiency is obtained in the chain of energy transformation, given that the electric components usually have better yields than the hydraulic components used in known truck mixers.

The present invention also concerns the method to make the drum of the truck mixer as described above rotate: the method comprises a first step in which the second motor means, comprising the electric motor connected to the drum, make the latter rotate, and a second step in which the electric motor is fed by an electric energy generator unit.

The method also provides that, in the second step it is provided to:
  connect the first motor means to an alternator to generate alternate electric energy,
  convert the alternate electric energy produced by the alternator into continuous electric energy,
  accumulate the continuous electric energy in an electric energy accumulator,
  convert the continuous electric energy of the accumulator once again into alternate energy, and
  feed the electric motor with the alternate electric energy in order to make the drum rotate directly.

DESCRIPTION OF THE DRAWINGS

These and other characteristics of the present invention will become apparent from the following description of a preferential form of embodiment, with reference to the attached drawings wherein.

DESCRIPTION OF ONE FORM OF EMBODIMENT

Figure 1:
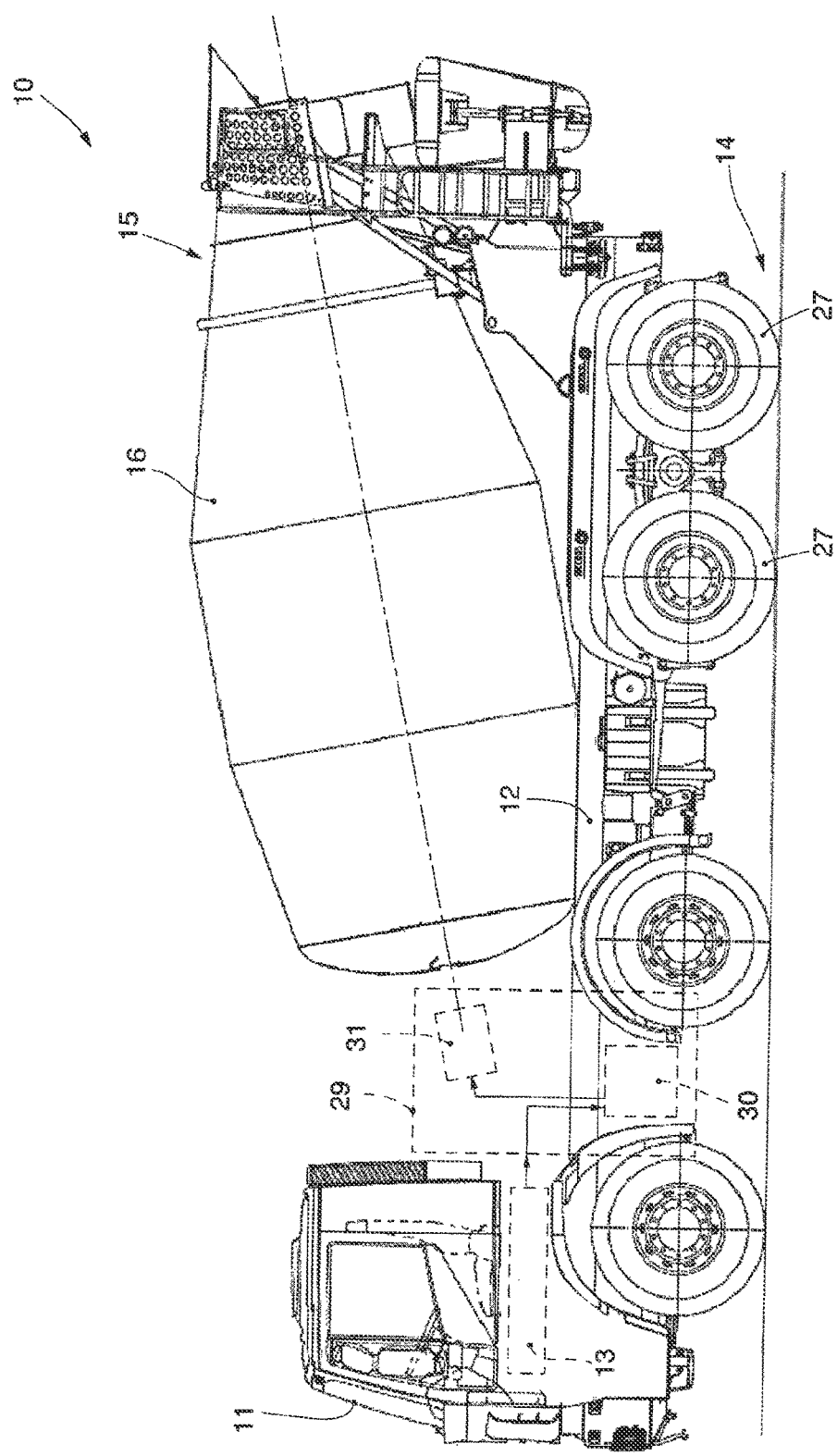
FIG. 1 is a lateral and schematic view of a truck mixer according to the present invention.

With reference to FIG. 1, a truck mixer 10 according to the present invention comprises a vehicle 11, for example a truck, of any known type, provided with a frame 12 on which a rotating drum 16 of a concrete mixer 15 is mounted. The capacity of the drum 16 is comprised, for example, between 4 cubic meters and 12 cubic meters.

Figure 2:
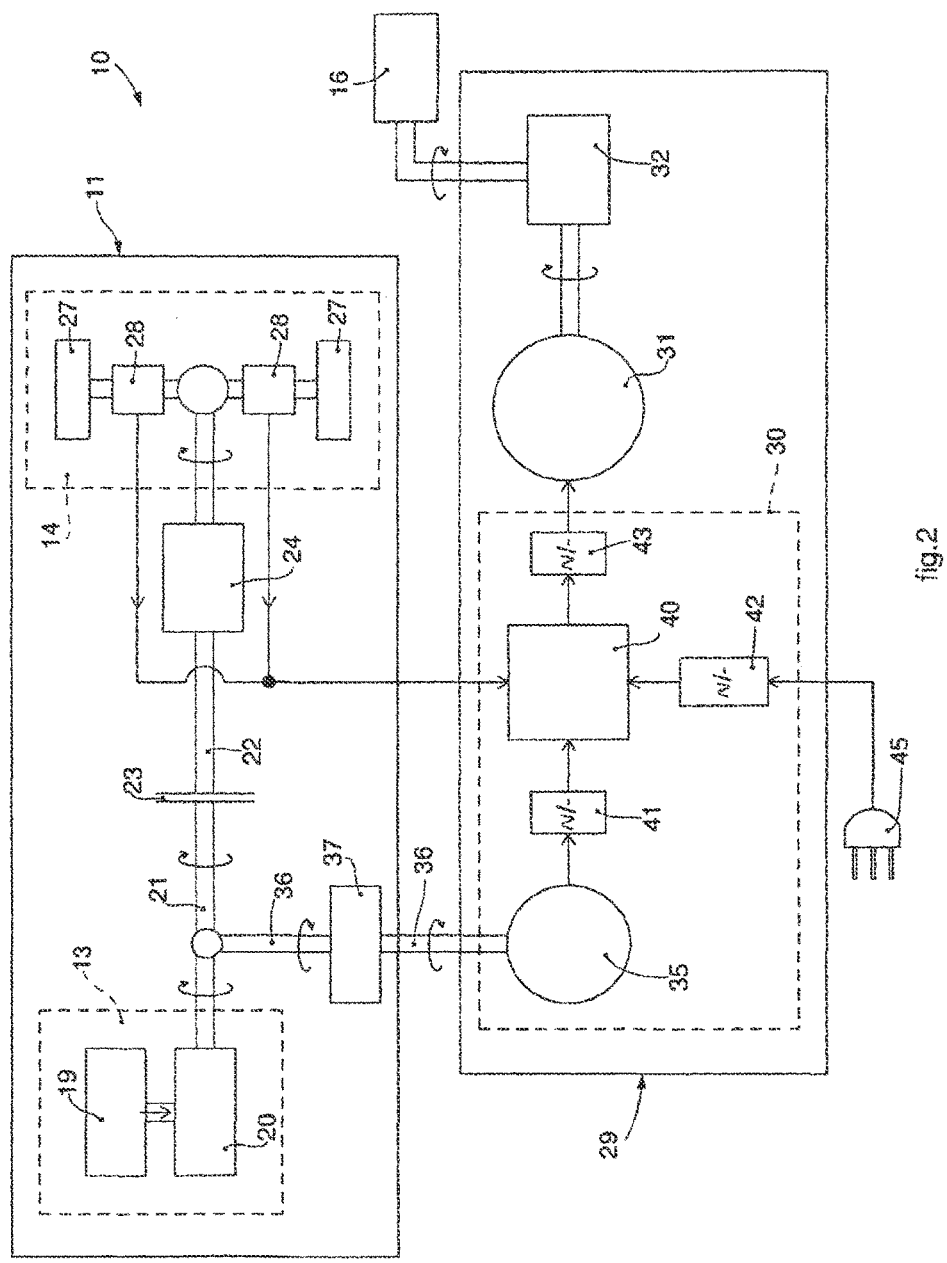
FIG. 2 is a schematized view of the truck mixer in FIG. 1.

The vehicle 11 is provided with a main motor unit 13 which comprises a heat engine 20 (FIG. 2), for example the diesel type, fed by fuel contained in a tank 19. The heat engine 20 is provided with a drive shaft 21 provided to make a transmission shaft 22 of a movement unit 14, provided with drive wheels 27, rotate by means of a clutch 23 and a gearbox 24, of any known type.

The heat engine 20, which is for example able to supply power comprised between 250 kW and 350 kW, by means of the movement unit 14, allows the vehicle 11 to move along the road, for example from the concrete production plant to a building site or vice versa.

One or more electronic devices to recover kinetic/mechanical energy 28, also known as KERS (Kinetic Energy Recovery System) are associated with the drive wheels 27, and allow to recover part of the kinetic/mechanical energy of the movement unit 14, which would otherwise be dispersed by the brakes in the form of heat, during the deceleration and braking of the truck mixer 10.

A device 29 suitable to make the drum 16 selectively rotate is mounted on the vehicle 11.

In this case the device 29 comprises an electric energy generator unit 30, suitable to feed an electric motor 31, for example of the three-phase type, which is connected mechanically, for example by means of reduction members such as a speed reducer 32, to the drum 16.

The electric energy generator unit 30 comprises an alternator 35, which is connected to the drive shaft 21, by means of a driven shaft 36 with the possible interposition of a speed reducer 37.

The alternator 35 is suitable to transform the mechanical energy of the drive shaft 21 into electric energy, in the form of alternate current, which is subsequently transformed into a continuous current needed to load one or more electric energy accumulators 40, which are rechargeable, of the lithium type for example.

The electric energy generator unit 30 also comprises the following three conversion means of electric energy, in this case three current converters:
  a first converter 41, to transform the alternate tension produced by the alternator 35 into continuous tension to feed the at least one accumulator 40;
  a second converter 43, in this case a current inverter, to transform the continuous tension available from the accumulators 40 into an alternate tension, needed to feed the electric motor 31, and
  another and possible third converter 42, to transform the alternate tension, coming from an external electric network 45, into a continuous tension, needed to feed the accumulators 40. The first converter 41 and the third converter 42 can each comprise one or more current rectifiers to allow the adequate feed of the accumulators 40.

The electric motor 41, fed by the electric energy generator unit 30, is able to supply the power needed, for example comprised between 50 kW and 80 kW, for the rotation of the drum 16.

The accumulators 40 can be recharged in one of the three following modalities.

A first recharging modality provides to connect the electric energy generator unit 30 to an external electric network 45. In this case the alternate current supplied by the external electric network 45 is converted, through the third converter 42, into a continuous current to charge the accumulators 40. Recharging the accumulators 40 by a connection to the electric network 45 can be quick if an industrial network is used or slower if a domestic-type network is used. To this purpose, the electric energy generator unit 30 can be provided with suitable electric components to allow connection either to a domestic network or to an industrial network.

A second recharging modality provides to use the mechanical energy derivable from the drive shaft 21. Indeed, by means of the driven shaft 36, this energy is able to make the alternator 35 active, which by means of the first converter 41 is able to supply the accumulators 40 with the energy needed to recharge them.

A third recharging modality provides that the accumulators 40 are recharged using part of the kinetic/mechanical energy of the movement unit 14, by means of electronic devices to recover kinetic/mechanical energy 28.

The electric motor 31 is fed directly by the accumulators 40 which, depending on the functioning conditions, are recharged directly either by the alternator 35, or by the electric network 45 or by the electronic devices to recover kinetic/mechanical energy 28 or alternatively by a combination of these three. This solution allows to optimize the charging of the accumulators 40 independently of the specific functioning needs required instantaneously by the electric motor 31. This allows to obtain an extremely versatile electric energy generator unit 30, with high functioning yields, and having a high functioning autonomy.

The truck mixer 10 as described heretofore functions as follows.

When the truck mixer 10 is stopped for a relatively long period, longer than an hour for example, such as when it is in a concrete production plant to be filled with concrete, the aforementioned first modality is used to charge the electric energy accumulators 40.

When the truck mixer 10 is moving, and the drum 16 is made to rotate slowly by the electric motor 31, then there is also the simultaneous recharging of the accumulators 40, using part of the mechanical energy of the drive shaft 21, that is, by means of the second recharging modality, and possibly part of the electric energy produced by the electronic devices 28, using the third recharging modality.

On the other hand, when the truck mixer 10 is stopped in the building site or nearby, and the drum 16 must continue to rotate, the electric motor 31 is fed exclusively using the electric energy of the accumulators 40. This step is characteristic of the functioning of the truck mixer 10 during the concrete-unloading step, as the accumulators 40 are completely charged.

In the case where the accumulators 40 are completely discharged, it is always possible to take power from the heat engine 20 to be converted into electric energy using the alternator 35.

It is clear that modifications and/or additions of parts may be made to the truck mixer 10 as described heretofore, without departing from the field and scope of the present invention.

It is also clear that, although the present invention has been described with reference to a specific example, a person of skill in the art shall certainly be able to achieve many other equivalent forms of truck mixer, having the characteristics as set forth in the claims and hence all coming within the field of protection defined thereby.

The invention claimed is:

1. Method to make rotate a drum of a truck concrete mixer having a vehicle provided with a first motor which cooperates with a wheeled movement unit, to effect the movement of said vehicle, said method comprising a first step in which a second motor, comprising an electric motor connected to said drum, makes said drum rotate, and a second step in which said electric motor is fed by an electric energy generator unit, wherein said second step provides to:
   connect said first motor means to an alternator to generate alternate electric energy,
   convert by means of a first converter the alternate electric energy produced by said alternator into continuous electric energy,
   accumulate said continuous electric energy in an electric energy accumulator,
   convert by means of a second converter said continuous electric energy of said accumulator once again into alternate energy,
   feed said electric motor with the alternate electric energy in order to directly make said drum rotate,
   connect said accumulator to an external source of electrical energy through a third converter to convert the electric energy supplied by said external source to said accumulator.

2. Method as in claim 1, wherein during said second step said electric energy generator unit transforms at least a part of the mechanical energy produced by said first motor into electric energy.

3. Method as in claim 1, wherein during said second step said at least one accumulator is electrically fed by at least a device to recover kinematic/mechanical energy produced by the brakes of said movement unit.

4. Method as in claim 2, wherein during said second step said at least one accumulator is electrically fed by at least a device to recover kinematic/mechanical energy produced by the brakes of said movement unit.

* * * * *